(12) United States Patent
Baudart

(10) Patent No.: US 9,010,801 B2
(45) Date of Patent: Apr. 21, 2015

(54) SAFETY DEVICE FOR VEHICLE

(71) Applicant: Faurecia Interieur Industrie, Nanterre (FR)

(72) Inventor: Laurent Baudart, Fresnoy en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/304,462

(22) Filed: Jun. 13, 2014

(65) Prior Publication Data

US 2014/0375027 A1    Dec. 25, 2014

(30) Foreign Application Priority Data

Jun. 24, 2013   (FR) ..................................... 13 56019

(51) Int. Cl.
| | |
|---|---|
| *B60R 21/215* | (2011.01) |
| *B60R 21/2165* | (2011.01) |
| *B60R 21/205* | (2011.01) |
| *B60R 13/02* | (2006.01) |
| *B60R 21/216* | (2011.01) |

(52) U.S. Cl.
CPC ........... *B60R 21/215* (2013.01); *B60R 21/2165* (2013.01); *B60R 2021/21537* (2013.01); *B60R 2021/2161* (2013.01); *B60R 13/0256* (2013.01); *B60R 21/205* (2013.01)

(58) Field of Classification Search
CPC   B60R 21/215; B60R 21/216; B60R 21/2165; B60R 21/205; B60R 2021/2161; B60R 2021/21512; B60R 2021/21537; B60R 13/0256

See application file for complete search history.

(56) References Cited

U.S. PATENT DOCUMENTS

| | | | |
|---|---|---|---|
| 5,125,683 A | | 6/1992 | Nakajima |
| 5,564,731 A | * | 10/1996 | Gallagher et al. ......... 280/728.3 |
| 5,975,563 A | * | 11/1999 | Gallagher et al. ......... 280/728.3 |
| 8,177,255 B2 | * | 5/2012 | Le Hoang et al. ......... 280/728.3 |
| 8,393,635 B2 | * | 3/2013 | Laboeck et al. ........... 280/728.3 |
| 8,424,905 B2 | * | 4/2013 | Brunet ....................... 280/728.3 |
| 2002/0074776 A1 | * | 6/2002 | Labrie et al. ............... 280/728.3 |
| 2007/0052211 A1 | | 3/2007 | Hayashi |
| 2008/0007032 A1 | | 1/2008 | Sadek et al. |
| 2009/0026740 A1 | * | 1/2009 | Dorn .......................... 280/728.3 |
| 2011/0109067 A1 | * | 5/2011 | Le Hoang et al. ......... 280/728.3 |
| 2011/0316261 A1 | | 12/2011 | Niessner et al. |
| 2012/0032467 A1 | * | 2/2012 | Ory ................................ 296/72 |

FOREIGN PATENT DOCUMENTS

| | | |
|---|---|---|
| DE | 19936353 A1 | 2/2001 |
| DE | 102006035208 A1 | 1/2008 |

(Continued)

*Primary Examiner* — Drew Brown
(74) *Attorney, Agent, or Firm* — Miller, Matthias & Hull LLP

(57) ABSTRACT

The present disclosure relates to a safety device for a vehicle arranged facing an airbag and comprising:
  a chute channel defining a housing for receiving the airbag and delimiting a deployment opening;
  a flap covering the opening of the chute channel in the non-inflated state of the airbag;
  a flexible net retaining the flap relative to the chute channel during the deployment of said airbag, comprising metal wires, extending in a main direction, from a first portion embedded in a fastening member of the flap to the chute channel, to a second portion embedded in the flap and comprising an articulation portion located between said first and second portions;
  and wherein the articulation portion of the net has a first lateral edge and a second lateral edge devoid of an exposed free end of metal wire.

11 Claims, 5 Drawing Sheets

(56) References Cited

FOREIGN PATENT DOCUMENTS

| EP | 1393994 | A1 | 3/2004 |
| EP | 1759935 | A1 | 3/2007 |
| FR | 2902727 | | 6/2006 |
| GB | 2386877 | A | 1/2003 |
| GB | 2440022 | A | 1/2008 |
| WO | WO-2005/090131 | A1 | 9/2005 |

* cited by examiner

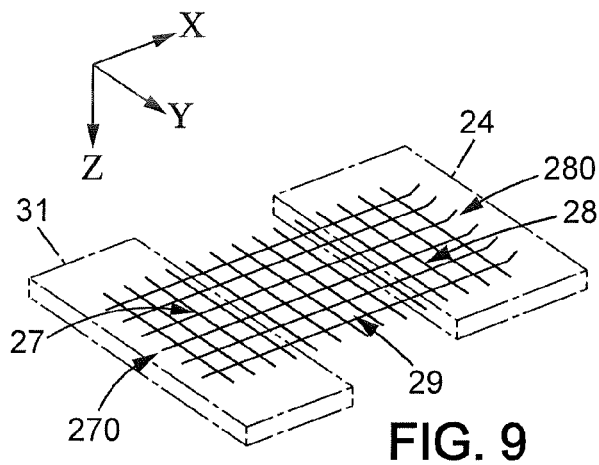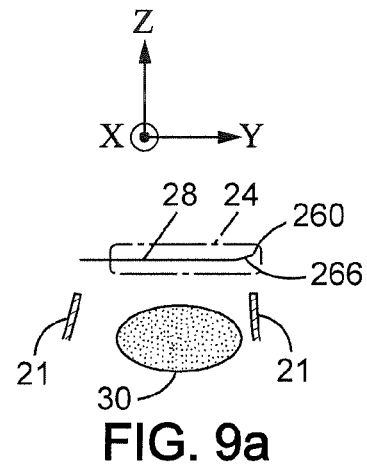
FIG. 9  FIG. 9a
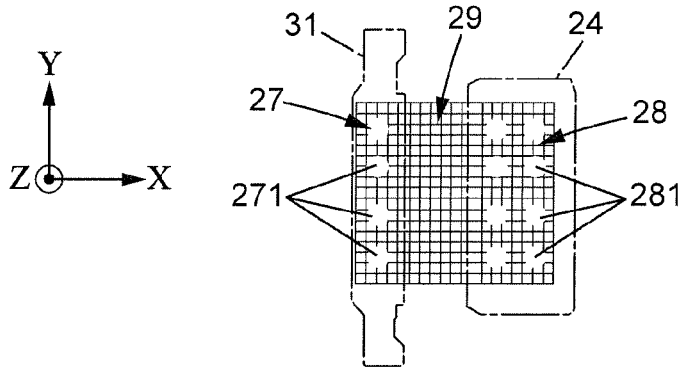
FIG. 10
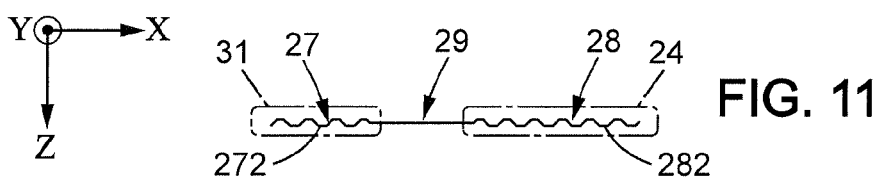
FIG. 11
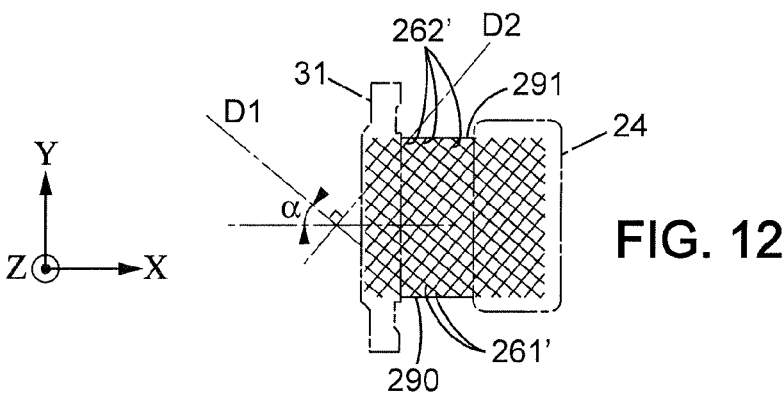
FIG. 12

SAFETY DEVICE FOR VEHICLE

CROSS-REFERENCE TO RELATED APPLICATIONS

This application claims priority under 35 USC §119 and the Paris Convention to French Patent Application No. FR 13 56019, filed on Jun. 24, 2013.

FIELD OF THE DISCLOSURE

This invention relates to safety devices for vehicle adapted to be arranged facing an airbag.

More particularly, the invention relates to the safety device for a vehicle adapted to be arranged facing an airbag and comprising:
- a chute channel defining a housing adapted to receive the airbag and delimiting a deployment opening for said airbag;
- a flap at least partially covering the opening of the chute channel in the non-deployed state of the airbag;
- a flexible net retaining the flap relative to the chute channel during the deployment of said airbag, comprising continuous metal wires having free ends and defining net meshes, said net extending in a main direction from a first portion embedded in a fastening member of the flap to the chute channel, to a second portion embedded in the flap and comprising an articulation portion located between said first and second portions;
- and wherein the articulation portion of the net has a first lateral edge and a second lateral edge extending globally in the main direction.

BACKGROUND OF THE DISCLOSURE

Document FR2902727 describes an example of such a safety device arranged in a vehicle dashboard. In this document, the chute channel is integral with a fixed portion of the dashboard and the flap is integral with a gate connected to the fixed portion of the dashboard by the intermediary of a line of least resistance. The unit formed of the flap and of the gate is intended to be separated from the fixed portion of the dashboard and of the chute channel under the effect of the deployment of the airbag through the opening delimited by the chute channel by rupture of this line of least resistance. The flexible net extending between a fastening member integral with a chute channel and the flap makes it possible to retain the unit formed of the flap and of the gate relative to the fixed portion of the dashboard during the deployment of the airbag in such a way as to prevent this unit from being freely projected in the direction of the passenger compartment of the vehicle under the effect of this deployment, which would risk causing additional injuries to the occupants of the vehicle.

Moreover, in the device according to this document, the articulation portion of the net is folded back on itself in several thicknesses in the non-inflated state of the airbag, with these various thicknesses unfolding during the deployment of the airbag in such a way that the unit formed of the flap and of the gate entirely clears the opening of the chute channel and does not hinder the deployment of the airbag.

However, there is a constant need to improve this type of device, in particular from an operating safety point of view.

SUMMARY OF THE DISCLOSURE

This invention has in particular for purpose to fulfil this objective.

To this end, according to the invention, a safety device of the aforementioned type is remarkable in that the first lateral edge and the second lateral edge of the articulation portion of the net are devoid of an exposed free end of metal wire.

Thanks to these arrangements, the invention proposes a safety device of which the operating safety is improved compared to known devices.

Indeed, in the known devices of the aforementioned type, slight variations were observed from one device to another in the deployment of the airbag, in particular with regards to the speed of deployment of the bag, its level of inflation and/or the area protected by the bag in the deployed state. Such variations can be particularly disturbing with regards to the safety of the occupants of the vehicle, the optimum deployment of the airbag being essential in order to minimise the injuries caused to the passengers of the vehicle in case of a collision.

Hence, seeking to identify the causes, potentially multiple, of the operating disparity of the aforementioned known safety devices, in particular in terms of quality, rapidity and uniformity in the deployment of the airbag from one device to another, the applicant noticed that in these known devices, the airbag was able during its deployment through the opening of the chute channel to come into contact fleetingly with free ends belonging to some of the metal wires forming the flexible net, located on lateral edges of the articulation portion of the latter. More precisely, these ends of metal wire having an irregular profile comprising in particular sharp barbs or projections, they were in fact able to briefly hook/retain the airbag during its deployment, thus slowing down and/or deviating this deployment, or in an extreme case to tear the wall of the airbag. Such a slowing down and/or such a deviation also lead to a non-optimal and/or incomplete deployment of the airbag or in an extreme case of tear of the bag to an absence of protection.

Hence, in the device according to the invention, by providing that the lateral edges of the articulation portion of the flexible net are devoid of an exposed free end of metal wire, i.e. not coated, not protected or "in the open air", and able to come into contact with the airbag, it is provided that the bag not be hooked during its deployment by such exposed free ends, which makes it possible to improve the reliability and the operating safety of the device.

In preferred embodiments of the invention, it is furthermore possible to have recourse to one and/or the other of the following arrangements:
- the metal wires forming the net are woven and include warp wires extending along to the main direction and at least one weft wire extending substantially in a lateral direction perpendicular to the main direction, and wherein the first and the second lateral edge of the articulation portion of the net are formed of return loops of the weft wire. Hence, in this embodiment, the articulation portion of the net comprises continuous central portions (i.e. not end portions) of the wrap wires, with the free ends of these wrap wires in the main direction being located on the one hand on the first portion of net embedded in the fastening member and on the other hand on the second portion of net embedded in the flap, and at least one weft wire woven as a zigzag in the plane of the net by passing alternatively below and above each warp wire, with the lateral edge or edges of the articulation portion of the net being formed of return loops of the weft wire. These return loops have a soft or non-aggressive profile, so they do not risk hindering in particular by hooking the proper deployment of the airbag through the opening of the chute channel. According to an advantageous arrangement of this embodiment, it can be provided that the warp wires have a first wire diameter and that the weft wire has a second wire diameter that is different from the first wire diameter.

the first and/or the second lateral edge of the articulation portion of the net have free ends of metal wires and wherein said free ends are covered with droplets of material, in particular of plastic material.

the first and/or the second lateral edge of the articulation portion of the net is provided with a protective element made of flexible material, in particular of flexible plastic material such as silicone or elastomere.

the articulation portion of the net has a first surface facing the opening of the chute channel and a second surface opposite the first surface, some at least of the metal wires forming the net comprise end portions folded/folded back onto said second surface, with these end portions having the shape of a loop, and the first and/or the second lateral edge of the articulation portion of the net is formed of the tops of the loops of said end portions.

the net has in the main direction a first end edge belonging to the first portion of net and a second end edge belonging to the second portion of net, some at least of the metal wires forming the net comprise end portions folded opposite the opening of the chute channel, and the second end edge of the net is formed from the ends of the end portions.

the fastening member and/or the flap is moulded on respectively the first portion of net and/or the second portion of net, and said first portion of net and/or said second portion of net has at least one orifice with dimensions greater than those of the mesh respectively of the first portion of net and/or of the second portion of net, and inside of which penetrates the material constitutive respectively of the fastening member and of the flap, in such a way as to improve the cohesion of the assembly between the fastening member and/or the flap and respectively the first portion of net and/or the second portion of net.

the fastening member and/or the flap is moulded on respectively the first portion of net and/or the second portion of net, and said first portion of net and/or said second portion of net has along the main direction ripples extending in a transverse direction perpendicular to the main direction, in such a way as to improve the cohesion of the assembly between the fastening member and/or the flap and respectively the first portion of net and/or the second portion of net. Thanks to these arrangements, an embossed portion is defined on the first portion and/or the second portion of net making it possible to increase the cohesion of the assembly between the fastening member and/or the flap and respectively the first portion of net and/or the second portion of net.

the net is comprised of intertwined metal wires comprising warp wires and weft wires substantially perpendicular to the warp wires, and wherein the warp wires and the weft wires form a non-zero angle, in particular between 30 and 60°, and more preferably about 45°, with the main direction of the net.

Regardless of the embodiment considered, it can be provided that the metal wires forming the flexible net do not all have the same diameters and this in order in particular to be able to obtain an optimum behaviour of the net in terms of mechanical resistance and transmission of efforts that appear within it during the deployment of the airbag. In particular, it can be provided that the net be comprised of a first set of substantially parallel metal wires extending in a first direction and having a first wire diameter and a second set of parallel metal wires extending in a second direction substantially perpendicular to the first direction and having a second wire diameter different from the first wire diameter.

Moreover, this invention also relates to a vehicle unit comprising a safety device such as described hereinabove and a trim panel having an outer surface intended to be directed in the direction of a vehicle passenger compartment and an inner surface opposite said outer surface, and comprising a fixed portion and a gate connected to said fixed portion by a line of least resistance and intended to be separated from said fixed portion under the effect of the deployment of the airbag, wherein said safety device is fixed on the inner surface of the trim element, with the chute channel and the fastening member being integral with the fixed portion and the flap being integral with the gate, and wherein an airbag is arranged in the housing of the safety device.

In a preferred embodiment of the invention, the trim panel is formed by a dashboard body belonging to a vehicle dashboard.

Alternatively, the trim panel can also be formed by a door panel, a central pillar or middle foot panel, a roof panel or other.

Other characteristics and advantages of the invention shall appear in the following description of one of its embodiments, given by way of a non-restricted example, with regards to the attached drawings.

BRIEF DESCRIPTION OF THE DRAWINGS

In the drawings:

FIG. 9 is a schematic perspective view of the safety device aiming to show a detail of the carrying out of the invention located on the front end edge of the net, with the latter shown in the developed state;

FIG. 9a is a schematic cross-section view of the device shown in FIG. 9;

FIG. 10 is a schematic top view of the safety device according to the invention aiming to show a detail of the invention located on first and second portions of net, with the latter shown in the developed state;

FIG. 11 is a schematic cross-section view of the safety device according to the invention aiming to show another detail of the invention located on first and second portions of net, with the latter shown in the developed state;

FIG. 12 is a schematic top view of the safety device according to the invention aiming to show an alternative embodiment of the invention wherein the metal wires constituting the net are directed in such a way as to form a non-zero angle with the main direction of the net, with the latter shown in the developed state.

DETAILED DESCRIPTION OF THE DISCLOSURE

In the various figures, the same references designate identical or similar elements.

Figure 1:
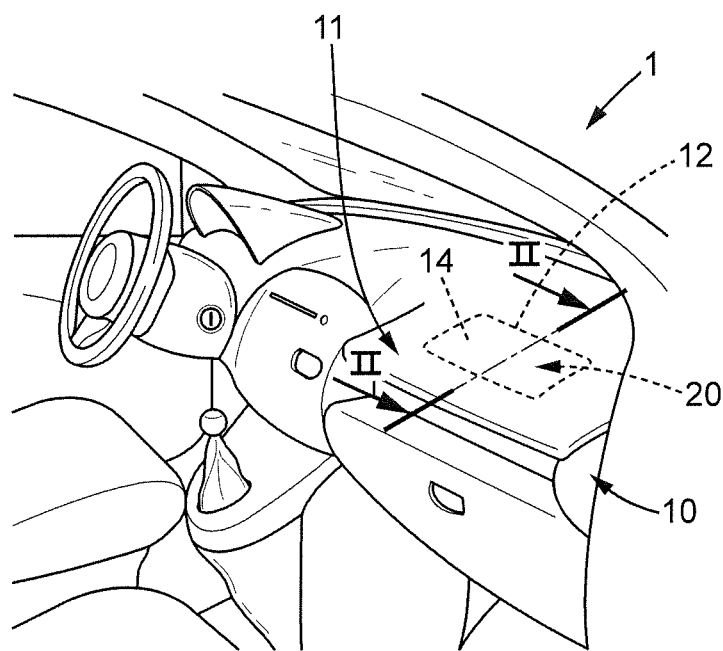
FIG. 1 is a schematic perspective view of the passenger compartment of a vehicle provided with a safety device according to the invention.

FIG. 1 schematically shows a passenger compartment of a vehicle 1 provided with an interior trim panel.

Here, the interior trim panel is formed by a dashboard body 10 belonging to a dashboard of the vehicle. However, in alternative embodiments of the invention, the interior trim panel of the vehicle could be formed by a door panel, a roof trim panel, a seat panel or any other type of trim panel provided on the passenger compartment of a vehicle.

Figure 2:
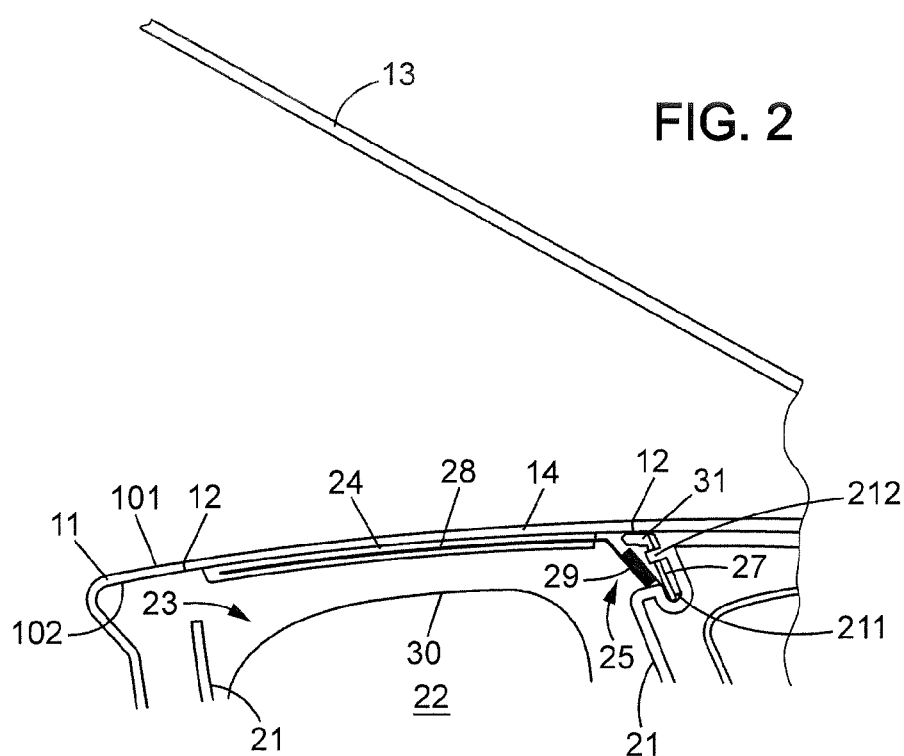
FIGS. 2 and 3 show an example of implementation of the safety device according to the invention in a vehicle dashboard provided with an airbag, on the one hand before the deployment of the bag (FIG. 2) and on the other hand after the deployment of the bag (FIG. 3)

As shown in particular in FIGS. 1 and 2, the dashboard body 10 has an outer surface 101 directed in the direction of the passenger compartment of the vehicle and an inner surface 102 opposite the inner surface 101, and comprises a fixed portion 11 and a gate 14 connected to the fixed portion by a line of least resistance 12 and intended to be separated from the fixed portion 11 under the effect of the deployment of an airbag 30 arranged in the non-deployed state under the dashboard body 10, i.e. facing the inner surface 102 of the dashboard body 10, by the gate 14.

A safety device 20 in accordance with the invention is housed under the dashboard body 10. More precisely, the safety device 20 is arranged between the board body 10 and the airbag 30.

Figure 3:
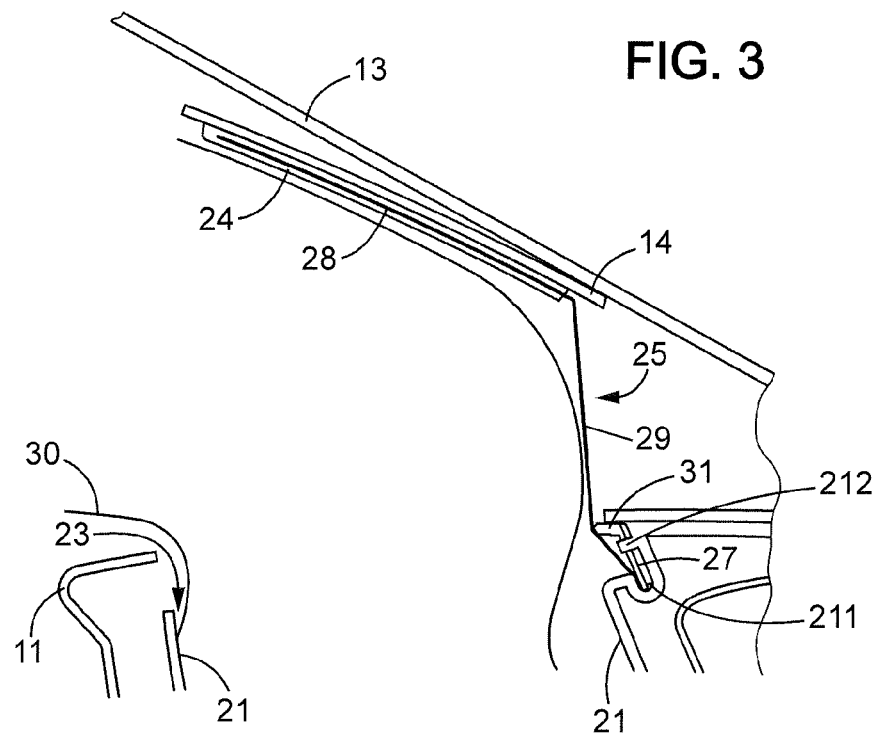

As shown in FIGS. 2 and 3, the safety device 20 comprises a chute channel 21 defining a housing 22 for receiving the airbag 30 and delimiting a deployment opening 23 for the airbag 30.

In the example shown in these FIGS. 2 and 3, it is observed that the chute channel 21 is shown in the form of a separate element fastened to the fixed portion 11 of the dashboard body 10, in particular by welding and in particular by ultrasound welding. Alternatively, it can be provided without leaving the scope of this invention that the chute channel be an integral part of the dashboard body. In this case, the chute channel can be formed of a set of ribs protruding from the inner surface of the dashboard body and extending along the contour of the line of least resistance separating the fixed portion of the board body and the gate.

Still in relation with FIGS. 2 and 3, the safety device 20 further comprises a flap 24 covering at least partially the opening 23 of the chute channel 21 in the non-deployed state of the airbag 30. This flap 24 is integral with the gate 14 and fixed to the latter in particular by welding and in particular by vibration welding.

The safety device 20 further comprises a flexible net 25 provided to retain the unit formed of the flap 24 and of the gate 14 relative to the chute channel 21 and to the fixed portion 11 of the dashboard body 10 during the deployment of the airbag 30 so that this flap 24/gate 14 unit is not freely projected in the direction of the passenger compartment of the vehicle, which would risk causing injuries to the occupants of the vehicle.

Figure 4:
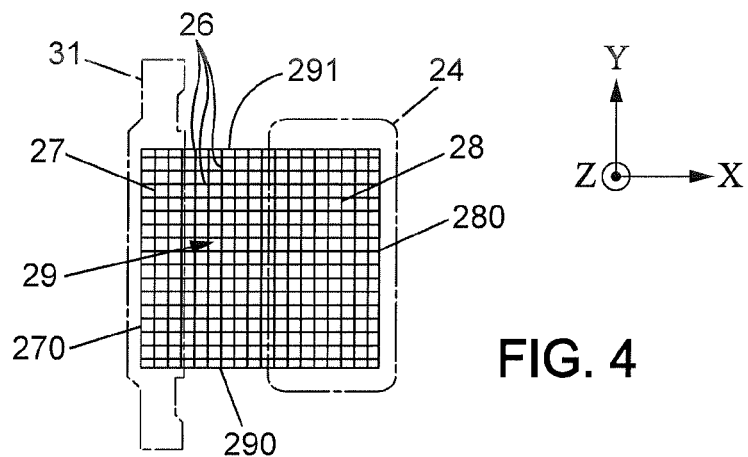
FIG. 4 is a schematic top view of the safety device according to the invention, with the net being shown in the developed state.

As can be seen in particular in FIGS. 2 to 4, the flexible net 25 extends in the developed state in a main direction X, here the direction of extension of net but it can be its transversal direction. The net comprises in the main direction X a first portion 27 embedded in a fastening member 31 of the flap 24 at the chute channel 21, a second portion 28 embedded in the flap 24, and an articulation portion 29 located between the first portion 27 and the second portion 28, free, i.e. not embedded, and with which the airbag 30 is able to come into contact during its deployment.

In the embodiment shown in the figures, the fastening member 31 is retained inside a housing 211 of the chute channel 21 provided with retaining fingers 212 as is described in more detail in the aforementioned document FR2902727.

Moreover, in the embodiment shown in FIGS. 2 and 3, the articulation portion 29 of the net has a substantial dimension in the main direction X between the two embedded portions 27, 28. The articulation portion 29 is folded onto itself in several thicknesses in the non-deployed state of the airbag 30. The sections folded onto themselves thus defined in the articulation portion 29 are maintained folded in the non-deployed state of the airbag 30 by means of a retaining device, such as a frangible link, adapted to exert a weak retaining force with regards to the efforts generated by the deployment of the airbag 30.

Hence, during its deployment, the airbag 30 comes into contact with the flap 24, which causes the rupture of the line of least resistance 12 retaining the gate 24 relative to the fixed portion 11 of the dashboard body 10. The unit formed of the flap 24 and of the gate 14 is then retained only by the articulation portion 29 of the net which, after rupture of the retaining device, unfolds in such a way as to sufficiently clear the opening 23 of the chute channel 21 so that the airbag 30 can be deployed, while avoiding that this unit be freely projected in the direction of the occupants of the vehicle.

As can be seen in FIG. 3, in the embodiment shown, the length in the main direction X of the articulation portion 29 of the net 25 is sufficient for the unit formed of the flap 24 and of the gate 14 to be thrust against the windscreen 13 of the vehicle during the deployment of the airbag 30. However, the invention also relates to the case where the articulation portion of the net is formed by a short section of net in the main direction, in such a way that the edge of the gate 14 adjacent to the flexible net 25 remains relatively close to the dashboard body 10, and the opposite end of the gate 14 can possibly strike the windscreen 13.

As shown more particularly in FIGS. 3 and 4, the flexible net 25 has a free articulation portion 29 with which the airbag 30 is able to come into contact during its deployment.

This flexible net 25 is comprised of continuous metal wires defining substantially regular net meshes. Choosing to carry out this net by means of metal wires makes it possible to both limit the manufacturing costs of it and to guarantee sufficient mechanical resistance in order to provide for the retaining of the flap 24/gate 14 unit relative to the chute channel 21 during the deployment of the airbag 30.

However, carrying out the flexible net 25 by means of metal wires, of which the free ends are able to have an irregular profile comprising in particular sharp barbs or projections, generates a risk of hooking the airbag during its deployment by such free ends located in the articulation portion 29 of the net.

More particularly, and as can be seen in particular in FIG. 4, as the metal wires 26 used to carry out the flexible net 25 are continuous, the risk of hooking of the airbag 30 during its deployment by free ends of wires is located on lateral edges 290, 291 of the articulation portion 29 which extend globally in the main direction X, and which are spaced from one another in a lateral direction Y perpendicular to the main direction X, with the flexible net 25 extending substantially in the plane defined by these directions X and Y, between a first end edge 270, or rear end edge, belonging to the first portion of net 27 embedded in the fastening member 31 and a second end edge 280, or front end edge, belonging to the second portion of net 28 embedded in the flap 24.

Hence, it is provided according to the invention that the first lateral edge 290 and the second lateral edge 291 of the articulation portion 29 of the net 25 be devoid of an exposed free end of metal wire.

Various solutions to this effect have been provided within the scope of this invention and shall be described hereinafter in reference to FIGS. 5 to 8.

In order to facilitate reading, these figures only show the flexible net 25 in the developed state and in solid lines, as well as the fastening member 31 and the flap 24 shown schematically in the form of parallelepiped blocks shown in mixed lines.

Figure 5:
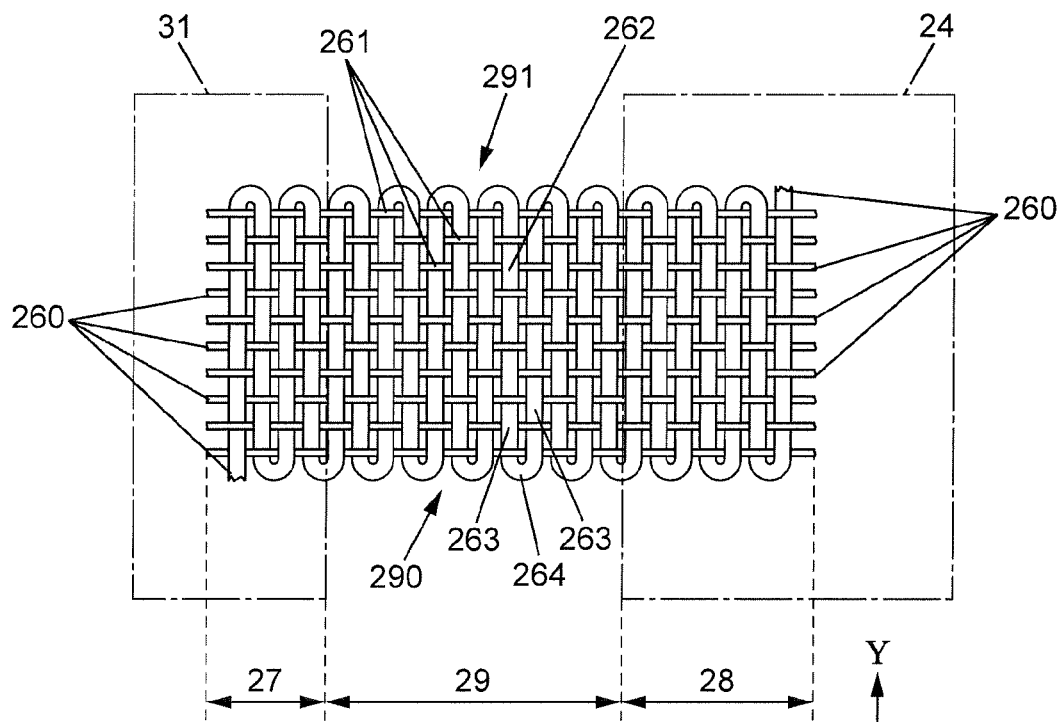
FIG. 5 is a schematic top view of the safety device according to a first embodiment of the invention, with the net being shown in the developed state.

Hence, in a first embodiment shown in FIG. 5, the metal wires 26 forming the flexible net 25 are woven in such a way that the lateral edges 290, 291 of the articulation portion 29 of the net 25 do not present any free ends of metal wire.

More precisely, in this embodiment, the metal wires 26 forming the net 25 include a plurality of warp wires 261 extending in the main direction X. These warp wires 261 each extend between a first end embedded inside the fastening member 31 and a second end embedded inside the flap. The first ends of metal wires 26 define the rear edge 270 of the net 25, and the second ends of metal wires 26 define the front edge 280 of the net 25.

Moreover, the metal wires 26 forming the net 25 also include at least one weft wire 262 interlaced with the warp wires 261 in such a way known per se. Also, and as can be seen in FIG. 5, the weft wire 262 extends along the main direction from a first end embedded inside the fastening member 31 and a second end embedded inside the flap. Between these two ends, the weft wire 262 extends substantially in the lateral direction Y perpendicular to the main direction X, by forming zigzags. In other words, the weft wire 262 has a plurality of straight portions 263 extending in the lateral direction Y, with each of these straight portions 263 being connected by a return loop 264.

As can be seen in FIG. 5, in this embodiment, the first and second lateral edges 290, 291 of the articulation portion 29 of the net 25 are formed by the return loops 264 of the weft wire 262. As these return loops 264 have a soft profile, i.e. non-aggressive for the airbag 30, any risk of the airbag 30 becoming hooked during its deployment by the articulation portion 29 exposed to the bag 30 of the net 25 is thus avoided.

According to an advantageous arrangement, and in the objective of designing a net 25 having mechanical characteristics adapted to the function that it fulfils, and in particular the retaining of the flap 24 relative to the chute channel 21, it can be provided in this embodiment shown in FIG. 5 that the warp wires 261 have a first wire diameter and that the weft wire 262 has a second wire diameter different from the first wire diameter.

Figure 6:
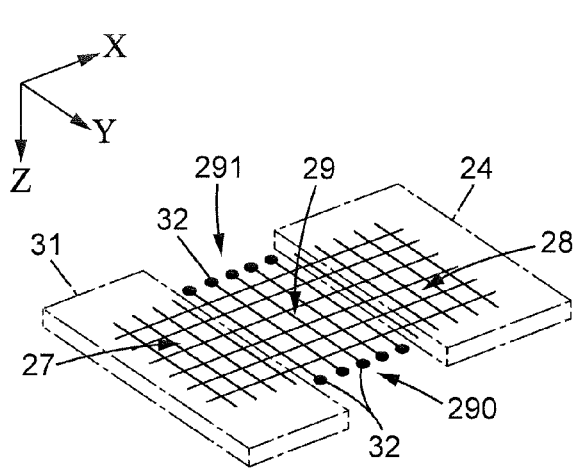
FIG. 6 is a schematic perspective view of the safety device according to a second embodiment of the invention, with the net being shown in the developed state.
Figure 6A:
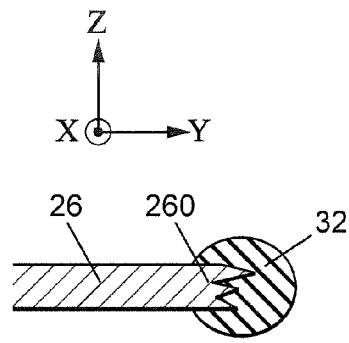
FIGS. 6a and 6b are enlarged schematic views aiming to show a detail of the safety device of FIG. 6.
Figure 6B:
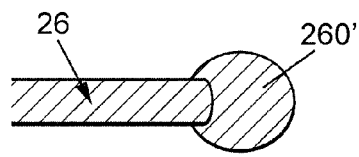

In a second embodiment shown in FIGS. 6, 6a and 6b, the net 25 is formed of intertwined metal wires 26, but not necessarily woven.

Hence, and such as is shown in FIG. 6, the net 25 comprises a first set of metal wires 26 extending in the main direction X, and a second set of metal wires extending in the lateral direction Y. The metal wires 26 belonging to the first set extend in the main direction X between a first end embedded in the fastening member 31 and a second end embedded in the flap 24; thus, the metal wires 26 belonging to the first set extend continuously and do not have any free end on the articulation portion 29 of the net 25 that risks hooking the airbag 30 during its deployment.

The metal wires 26 belonging to the second set each extend in the lateral direction Y between two ends. On the first portion 27 of the net 25 and the second portion 28 of net 25, the ends of the wires 26 extending in the lateral direction Y are embedded respectively inside the fastening member 31 and the flap 24. Thus, the ends of the metal wires 26 extending in the lateral direction Y and belonging to the first and to the second portions 27, 28 of the net 25 are rendered inaccessible for the airbag 30 and do not risk hindering its deployment.

On the articulation portion 29 of the net 25, the metal wires 26 extending in the lateral direction Y have free ends 260. In other words, the lateral edges 290, 291 of the articulation portion 29 of the net 25 have free ends 260.

If these free ends 260 located on lateral edges 290, 291 of the articulation portion 29 of the net 25 were left exposed, they would be able to hook the airbag 30 during its deployment. Hence, in this second embodiment of the invention and such as is shown more in detail in FIG. 6a, it is provided that free ends 260 located on lateral edges 290, 291 of the articulation portion 29 of the net 25 are covered with droplets 32 of a filler material, in particular plastic material. These free ends 260 located on lateral edges 290, 291 of the articulation portion 29 of the net 25 are thus each provided with a protective element formed from such a droplet 32 having a non-aggressive profile for the airbag 30. In other words, these free ends 260 present on lateral edges 290, 291 of the articulation portion 29 of the net 25 are not exposed to the airbag 30 during its deployment, with each of these ends 260 having been embedded inside a protective droplet 32.

Alternatively, and such as shown in FIG. 6b, it can be provided that the droplets be formed by the material constituting the metal wires 26. More precisely, in this alternative embodiment, the free ends 260 of wire 26 located on lateral edges 290, 291 of the articulation portion 29 of the net 25 can be melted by means of a heating device adapted in such a way as to make the sharp and/or protruding edges of these ends 260 disappear. After cooling, the free ends of the wires 26 located on lateral edges 290, 291 of the articulation portion 29 of the net 25 then have a rounded non-aggressive profile 260' for the airbag 30.

Figure 7:
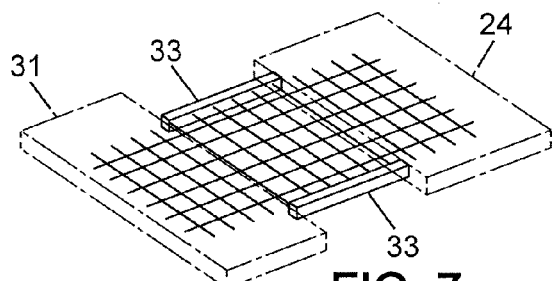
FIG. 7 is a schematic perspective view of the safety device according to a third embodiment of the invention, with the net being shown in the developed state.
Figure 7A:
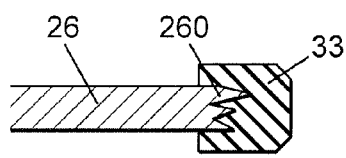
FIG. 7a is an enlarged schematic view aiming to show a detail of the safety device of FIG. 7.

In a third embodiment shown in FIGS. 7 and 7a, the net 25 substantially has the same structure as that of FIG. 6, and the first and second lateral edges 290, 291 of the articulation portion 29 of the net 25 are each provided with a protective element 33 extending in the main direction X. This protective element 33 comes to cover the free ends 260 of the metal wires located on lateral edges 290, 291 in such a way that these ends 260 are not exposed to the airbag 30 during its deployment.

Moreover, these protective elements 33 are made from a flexible material, such as silicone or elastomere, in such a way as to be able to follow the deformations of the articulation portion 29 of the flexible net 25, in particular when the latter 29 is folded on itself in several superimposed sections in the non-deployed state of the airbag 30 such as can be seen in FIG. 2 and described hereinabove.

Figure 8:
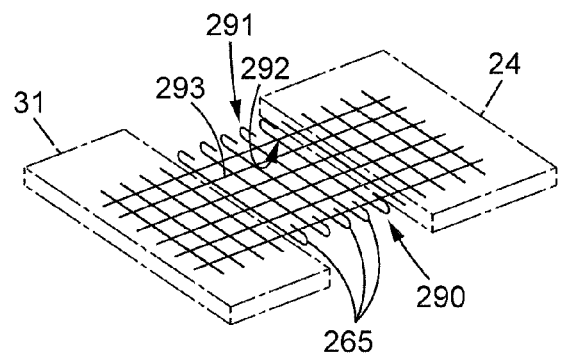
FIG. 8 is a schematic perspective view of the safety device according to a fourth embodiment of the invention, with the net being shown in the developed state.
Figure 8A:
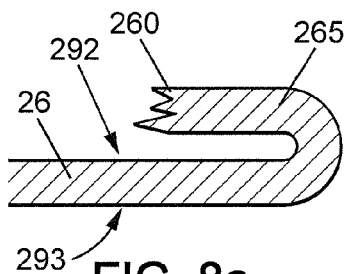
FIG. 8a is an enlarged schematic view aiming to show a detail of the safety device of FIG. 8.

A fourth embodiment of the invention in relation with FIGS. 8 and 8a shall now be described.

In this embodiment, the net 25 substantially has the same structure as that of FIG. 6, and the articulation portion 29 of the net 25 has a first surface 292 intended to be directed in the direction of the opening 23 of the chute channel 21 and a second surface 293 opposite. Moreover, in this embodiment, the metal wires 26 extending in the lateral direction Y and belonging to the articulation portion 29 of the net 25 comprise end portions 265 folded and/or folded back onto the second surface 293 of the net 25, i.e. opposite the opening 23 of the chute channel 21. These end portions 265 each have a loop shape, and the first and second lateral edges 290, 291 of the articulation portion 29 of the net 25 are formed from the tops of the loops of these end portions 265.

Hence, in this fourth embodiment, the free ends 260 of the metal wires present on the articulation portion 29 of the net 25 are rendered inaccessible for the airbag 30 during its deployment by being brought back on the surface 293 of the net 25 located opposite the opening 23 of the chute channel 21. The airbag 30 is prevented as well from coming into contact with these free ends 260 during its deployment; in other words, these free ends 260 are prevented from being exposed to the airbag 30 during its deployment.

According to an advantageous arrangement of this invention, and such as is shown in FIGS. 9 and 9*a*, it can be provided that none of the elements of the safety device able to come into contact with the airbag 30 during its deployment have an exposed free end that could hook the bag 30.

In particular, the flap 24, wherein the second portion of net 28 is embedded, must not have any exposed free end of metal wire. In other words, the set of free ends of the metal wires belonging to the second portion of net 28 must be properly embedded inside the material comprising the flap 24, or at least cannot come into contact with the airbag 30 during its deployment. Indeed, although the second portion of net 28 is substantially embedded inside the flap 24, it is still possible that the net 25 locally has an irregularity such that one or several free ends of metal wire are not in line with the plane globally defined by the net 25 and are slightly protruding outside of the flap 24, and in particular the surface of the flap 24 located facing the opening 23 of the chute channel 21.

So, in order to minimise this risk, it is provided that the metal wires 26 belonging to the second portion of net 28 include end portions 266 folded opposite the opening 23 of the chute channel 21. In this way, the risk that an irregularity in the net 25 causes a free end 260 of metal wire to exceed the surface of the flap 24 intended to be impacted by the airbag 30 during its deployment is minimised.

Hence, and as can be seen in FIGS. 9 and 9*a*, it can for example be provided that the metal wires 26 of the second portion of net 28 that extend in the main direction X have end portions 266 folded opposite the opening 23 of the chute channel 21. These end portions 266 then form the front end edge 280 of the net 25.

According to another advantageous arrangement of this invention shown in particular in FIG. 10, the fastening member 31 is moulded on the first portion of net 27 and the flap 24 is moulded on the second portion of net 28.

The first portion of net 27 has at least one, and in the example shown four, orifices 271 with dimensions greater than those of the mesh of the first portion of net 27. During the operation of moulding of the fastening member 31 on the first portion of net 27, the material that constitutes the fastening member 31 penetrates inside these orifices 271 in such a way as to improve the cohesion and the resistance of the assembly between the fastening member 31 and the first portion of net 27.

The second portion of net 28 has at least one, and in the example shown eight, orifices 272 with dimensions greater than those of the mesh of the second portion of net 28. During the operation of moulding of the flap 24 on the second portion of net 28, the material comprising the flap 24 penetrates inside these orifices 272 in such a way as to improve the cohesion and the resistance of the assembly between the flap 24 and the second portion of net 28.

As an alternative or as a complement, and still with the objective of improving the cohesion and the mechanical resistance of the assembly between the net 25 and the elements moulded on the latter, namely the fastening member 31 and the flap 24, it is provided that the first portion of net 27 and the second portion of net 28 have along the main direction X ripples 272, 282 extending in a transverse direction Z perpendicular to the main direction X and to the lateral direction Y, or orthogonal to the plane of the net 25.

Hence, and as is clearly shown in FIG. 11, the first portion of net 27 has ripples 272 defining an embossed portion on the first portion of net 27, and the second portion of net 28 has ripples 282 defining an embossed portion on the second portion of net 28. These embossed portions defined by the ripples 272, 282 make it possible to increase the contact surface between the first portion of net 27 and the fastening member 31, and between the second portion of net 28 and the flap 24, which makes it possible to reinforce the assembly of these elements.

Finally, and according to an alternative embodiment of the invention shown in FIG. 12, it can be provided that the net 25 be comprised of intertwined metal wires 26, but not necessarily woven, comprising a first set of parallel wires 261' extending in a first direction D1 and a second set of parallel wires 262' extending in a second direction D2 perpendicular to the first direction D1, and that the first direction D1 forms a non-zero angle $\alpha$, in particular between 30° and 60°, and more preferably of about 45°, with the main direction of the net X.

In FIG. 12, the first direction D1 forms an angle substantially equal to 45° with the main direction X of the net 25; note that in this embodiment, the first and second directions D1, D2 being substantially perpendicular, the second direction D2 also forms an angle substantially equal to 45° with the main direction of the net 25. Such an arrangement makes it possible to adapt the distribution and the transmission of the efforts within the net 25 to the specific needs of the safety device, in particular in terms of energy absorption.

In this embodiment shown in FIG. 12, the lateral edges 290, 291 of the articulation portion 29 of the net 25 will be protected in such a way as to not have an exposed free end of metal wire by means of devices according to the second, third or fourth embodiments described hereinabove.

The invention claimed is:

1. A safety device for a vehicle adapted to be arranged facing an airbag and comprising:
   a chute channel defining a housing adapted to receive the airbag and delimiting a deployment opening of said airbag;
   a flap covering at least partially the opening of the chute channel in the non-deployed state of the airbag;
   a flexible net retaining the flap relative to the chute channel during the deployment of said airbag, comprising continuous metal wires having free ends and defining net meshes, said net extending in a main direction, from a first portion embedded in a fastening member of the flap at the chute channel, to a second portion embedded in the flap and comprising an articulation portion located between said first and second portions;

and wherein the articulation portion of the net has a first lateral edge and a second lateral edge extending globally in the main direction;

and wherein the first lateral edge and the second lateral edge of the articulation portion of the net are devoid of an exposed free end of metal wire.

2. The safety device according to claim 1, wherein the metal wires forming the net are woven and include warp wires extending along the main direction and at least one weft wire extending substantially in a lateral direction perpendicular to the main direction, and wherein the first and the second lateral edge of the articulation portion of the net are formed of return loops of the weft wire.

3. The safety device according to claim 1, wherein the first and/or the second lateral edge of the articulation portion of the net have free ends of metal wires and wherein said free ends are covered with droplets of material, in particular plastic material.

4. The safety device according to claim 1, wherein the first and/or the second lateral edge of the articulation portion of the net is provided with a protective element made of flexible material, in particular of flexible plastic material such as silicone or elastomere.

5. The safety device according to claim 1, wherein:
the articulation portion of the net has a first surface facing the opening of the chute channel and a second surface opposite the first surface,
some at least of the metal wires forming the net comprise end portions folded/folded back onto said second surface, with these end portions having a loop shape, and
the first and/or the second lateral edge of the articulation portion of the net is formed of the tops of the loops of said end portions.

6. The safety device according to claim 1, wherein:
the net has in the main direction a first end edge belonging to the first portion of net and a second end edge belonging to the second portion of net,
some at least of the metal wires forming the net comprise end portions folded opposite the opening of the chute channel, and
the second end edge of the net is formed of the ends of the end portions.

7. The safety device according to claim 1, wherein the fastening member and/or the flap is moulded on respectively the first portion of net and/or the second portion of net, and wherein said first portion of net and/or said second portion of net has at least one orifice with dimensions greater than those of the mesh respectively of the first portion of net and/or of the second portion of net, and inside of which penetrates the material that constitutes respectively the fastening member and the flap, in such a way as to improve the cohesion of the assembly between the fastening member and/or the flap and respectively the first portion of net and/or the second portion of net.

8. The safety device according to claim 1, wherein the fastening member and/or the flap is moulded on respectively the first portion of net and/or the second portion of net, and wherein said first portion of net and/or said second portion of net has along the main direction ripples extending in a transverse direction perpendicular to the main direction, in such a way as to improve the cohesion of the assembly between the fastening member and/or the flap and respectively the first portion of net and/or the second portion of net.

9. The safety device according to claim 1, wherein the net is comprised of intertwined metal wires comprising a first set of parallel wires extending in a first direction and a second set of parallel wires extending in a second direction substantially perpendicular to the first direction, and wherein the first direction forms a non-zero angle, in particular between 30 and 60°, and more preferably about 45°, with the main direction of the net.

10. A vehicle unit comprising a safety device according to claim 1 and a trim panel having an outer surface intended to be directed in the direction of a vehicle passenger compartment and an inner surface opposite said outer surface, and comprising a fixed portion and a gate connected to said fixed portion by a line of least resistance and intended to be separated from said fixed portion under the effect of the deployment of the airbag,
wherein said safety device is fixed on the inner surface of the trim element, with the chute channel and the fastening member being integral with the fixed portion and the flap being integral with the gate,
and wherein an airbag is arranged in the housing of the safety device.

11. The vehicle unit according to claim 10, wherein the trim panel is formed by a dashboard body belonging to a vehicle dashboard.

* * * * *